US011580777B2

(12) United States Patent
Matsuo et al.

(10) Patent No.: US 11,580,777 B2
(45) Date of Patent: Feb. 14, 2023

(54) CONTROL APPARATUS AND COMPUTER-READABLE STORAGE MEDIUM

(71) Applicant: HONDA MOTOR CO., LTD., Tokyo (JP)

(72) Inventors: Yoshikazu Matsuo, Saitama (JP); Hisumi Esaki, Saitama (JP); Takashi Okada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 16/716,501

(22) Filed: Dec. 17, 2019

(65) Prior Publication Data

US 2020/0202108 A1 Jun. 25, 2020

(30) Foreign Application Priority Data

Dec. 19, 2018 (JP) .............................. JP2018-237784

(51) Int. Cl.
*G06K 9/00* (2022.01)
*G06V 40/16* (2022.01)
*B60W 50/14* (2020.01)
*G05D 1/00* (2006.01)

(52) U.S. Cl.
CPC .............. *G06V 40/16* (2022.01); *B60W 50/14* (2013.01); *G05D 1/0088* (2013.01); *B60W 2050/146* (2013.01); *G05D 2201/0213* (2013.01); *G06V 40/179* (2022.01)

(58) Field of Classification Search
CPC ...... G06V 40/16; G06V 40/179; G06V 20/59; G06V 40/174; G06V 40/166; B60W 50/14; B60W 2050/146; B60W 40/02; G05D 1/0088; G05D 2201/0213; G05D 1/0246; G05D 1/0223; G05D 1/0259; G05D 1/0276; G05D 1/0278; G05D 2201/02
See application file for complete search history.

(56) References Cited

U.S. PATENT DOCUMENTS

| | | | |
|---|---|---|---|
| 2016/0035222 A1* | 2/2016 | Mikuni ................ | G08G 1/0962 701/117 |
| 2018/0257647 A1* | 9/2018 | Jurca ..................... | G01S 13/931 |
| 2020/0064146 A1* | 2/2020 | Kitajima ............ | G01C 21/3608 |

FOREIGN PATENT DOCUMENTS

JP 2013164664 A 8/2013

* cited by examiner

*Primary Examiner* — Dhaval V Patel

(57) ABSTRACT

A control apparatus is provided, including: an other-vehicle emotion acquiring unit configured to acquire an other-vehicle emotion indicating an emotion of an occupant of a second vehicle different from a first vehicle; a determination unit configured to determine whether to perform notification to an occupant of the first vehicle based on the other-vehicle emotion; and a notification control unit configured to perform control to notify the occupant of the first vehicle of notification information based on the other-vehicle emotion when the determination unit determines to perform the notification.

13 Claims, 9 Drawing Sheets

CONTROL APPARATUS AND COMPUTER-READABLE STORAGE MEDIUM

The contents of the following Japanese patent application are incorporated herein by reference: 2018-237784 filed in JP on Dec. 19, 2018

BACKGROUND

1. Technical Field

The present invention relates to a control apparatus and a computer-readable storage medium.

2. Related Art

A known information-output apparatus acquires the emotion of an occupant of another vehicle and displays it on a display in the vehicle (see Patent document 1, for example).

Patent Document 1: Japanese Patent Application Publication No. 2013-164664

SUMMARY

It is desired to provide a technique to notify an occupant of a vehicle of appropriate information according to the emotion of an occupant of another vehicle near the vehicle.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
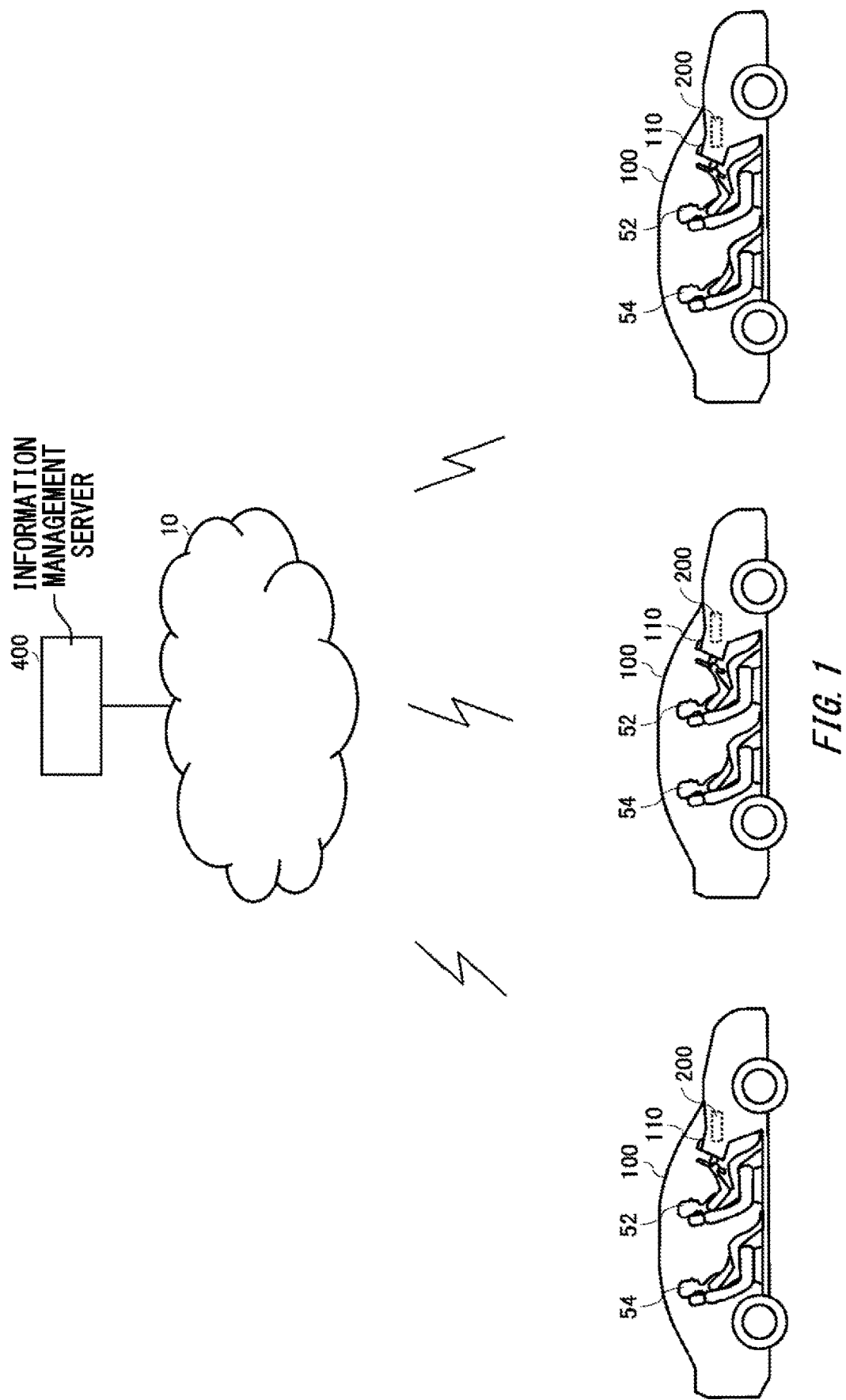
FIG. 1 schematically shows an example of a vehicle 100 according to the present embodiment.

FIG. 1 schematically shows an example of a vehicle 100 according to the present embodiment. The vehicle 100 may include a control apparatus 200. The control apparatus 200 has a notification control function to perform control to notify an occupant of the vehicle 100, which is a vehicle provided with the control apparatus 200 (which may be referred to as a "subject vehicle"), of notification information based on the emotion of an occupant of another vehicle 100 different from the subject vehicle (which may be referred to as an "other-vehicle emotion").

In the present embodiment, if persons in the vehicle 100 are not distinguished, the persons are referred to as occupants, and if a person who is driving and a person who is not driving are distinguished, the former is referred to as a driver 52 and the latter is referred to as a passenger 54. If the vehicle 100 is an automated driving vehicle, the driver 52 may be a person sitting on a driver's seat. The passenger 54 may be a person sitting on a front passenger seat. The passenger 54 may be a person sitting on a backseat.

In the present embodiment, the emotion of an occupant of the vehicle 100 refers to, for example, the emotion of the driver 52 of the vehicle 100. Even if there are a plurality of occupants in the vehicle 100, the emotion of an occupant of the vehicle 100 may refer to the emotion of the driver 52 of the vehicle 100. The emotion of an occupant of the vehicle 100 may also refer to a collective emotion of the plurality of occupants of the vehicle 100. The collective emotion of the plurality of occupants may be an emotion determined by applying majority decision on the emotions of the plurality of occupants. The collective emotion of the plurality of occupants may also be an emotion determined by averaging the emotions of the plurality of occupants.

The vehicle 100 is capable of performing emotion estimation processing to estimate the emotion of an occupant of the vehicle 100. The emotion estimation processing may be performed by the control apparatus 200. The emotion estimation processing may also be performed by an apparatus other than the control apparatus 200 included in the vehicle 100. The following mainly describes an example in which the control apparatus 200 performs the emotion estimation processing.

The control apparatus 200 may be capable of performing emotion estimation processing to estimate the emotion of an occupant using an image of the occupant. The control apparatus 200 acquires an image of the occupant captured by an image-capturing unit included in the vehicle 100. The image-capturing unit may have one camera 110 capable of capturing images of the entire cabin of the vehicle 100. The control apparatus 200 may acquire an image of the driver 52 and an image of the passenger 54 from the camera 110.

The image-capturing unit may have a plurality of cameras 110. The control apparatus 200 may acquire, from the plurality of cameras 110, an image of the driver 52 and an image of the passenger 54 that are captured by respective ones of the plurality of cameras 110. For example, the image-capturing unit has a camera 110 capable of capturing images of the driver's seat and front passenger seat and a camera 110 capable of capturing images of the backseat. The image-capturing unit may have a camera 110 capable of capturing images of the driver's seat and a camera 110 capable of capturing images of the front passenger seat. The image-capturing unit may have a plurality of cameras 110 capable of capturing images of respective ones of a plurality of passengers 54 in the backseat.

For example, the control apparatus 200 pre-stores an image of the occupant with a neutral facial expression. The neutral facial expression may be a "plain" facial expression. For example, the plain facial expression of an occupant is a facial expression of the occupant when being conscious of nothing. The control apparatus 200 may estimate the emotion of the occupant by comparing a face image of the occupant captured by the camera 110 and the image with the neutral facial expression.

For example, the control apparatus 200 stores the image of the occupant with the neutral facial expression captured by the camera 110 at initial settings. The control apparatus 200 may receive the image of the occupant with the neutral facial expression from another apparatus and store it. For example, the control apparatus 200 receives the image of the occupant with the neutral facial expression via short-range wireless communication, such as Bluetooth (registered trademark), from a mobile communication terminal, such as a smartphone, owned by the occupant. Also, for example, the control apparatus 200 receives the image of the occupant with the neutral facial expression via a mobile communication network or the like from a management server that manages the image of the occupant with the neutral facial expression.

The control apparatus 200 may estimate the emotion of the occupant by using a generic image of the neutral facial expression, rather than using the image of the occupant with the neutral facial expression. The generic image of the neutral facial expression may be an averaged image of the neutral facial expressions of a number of persons. The generic image of the neutral facial expression may be prepared for each attribute such as gender, age and race.

For example, the control apparatus 200 pre-stores association data in which the difference from the neutral facial expression is associated with a pattern of human emotions. For example, in the association data, a facial expression with mouth corners lifted as compared to the neutral facial expression is associated with a positive emotion, and a facial expression with mouth corners lowered as compared to the neutral facial expression is associated with a negative emotion. The control apparatus 200 identifies one of the pattern of emotions based on the image of the occupant captured by the camera 110, the image with the neutral facial expression and the association data, to provide an estimation result of the emotion of the occupant.

For example, the pattern of human emotions adopted may be a pattern of emotions based on Russell's circumplex model, which expresses human emotions on two axes of "Arousal" and "Valence" and expresses emotion degrees by the distance from the origin. Also, for example, the pattern of emotions adopted may be that based on Plutchik's wheel of emotions, which classifies human emotions into eight basic emotions (joy, trust, fear, surprise, sadness, disgust, anger and anticipation) and advanced emotions each combining two adjacent emotions. Any pattern of emotions may be adopted for the control apparatus 200 according to the present embodiment, without being limited to these.

The control apparatus 200 may also estimate the emotion of the occupant by, instead of using the image with the neutral facial expression, storing a plurality of face images of the occupant when having respective types of emotions and thereafter comparing face images of the occupant captured by the camera 110 with the stored face images. For example, the control apparatus 200 identifies the face image that is the most similar of the stored face images to the face image of the occupant captured by the camera 110, and determines the emotion corresponding to the identified face image as an estimation result of the emotion of the occupant.

The control apparatus 200 may estimate the emotion of the occupant based on changes in face images of the occupant or the like, instead of using pre-stored images. There are various known techniques for estimating the emotion of a person from a face image of the person, and any of the various techniques may be adopted.

The control apparatus 200 may also be capable of performing emotion estimation processing by estimating the emotion of the occupant using a voice of the occupant. For example, the control apparatus 200 performs the emotion estimation processing based on a feature of the voice itself. Examples of features of a voice itself can include the volume, tone, spectrum, fundamental frequency and the like of the voice. The control apparatus 200 may perform the emotion estimation processing based on a text string obtained from speech recognition on a voice. The control apparatus 200 may also perform the emotion estimation processing based on both of a feature of a voice itself and a text string obtained from speech recognition on the voice. If the vehicle 100 includes a plurality of microphones for picking up respective voices of a plurality of occupants, the control apparatus 200 may identify the speaker based on the difference between the microphones. If a single microphone is used to pick up voices of a plurality of occupants, the control apparatus 200 may identify the speaker by using a known speaker identification function. Examples of the known speaker identification function include a method using voice features, a method of determining from the direction of capturing the voice, and the like. There are various known techniques for estimating the emotion of a person from a voice of the person, and any of the various techniques may be adopted for the control apparatus 200.

The control apparatus 200 may also be capable of performing emotion estimation processing by estimating the emotion of the occupant using information other than an image or voice of the occupant. For example, the control apparatus 200 performs the emotion estimation processing by using the heartbeat, pulse rate, sweating, blood pressure, body temperature and the like of the occupant. There are various known techniques for estimating the emotion of a person from the heartbeat, pulse rate, sweating, blood pressure, body temperature and the like of the person, and any of the various techniques may be adopted for the control apparatus 200.

The vehicle 100 shares the emotion of the occupant of the vehicle 100 with another vehicle. For example, the vehicle 100 sends the emotion of the occupant of the vehicle 100 to an information management server 400 via a network 10. The network 10 may be any network. For example, the network 10 may include mobile communication systems such as a 3G (3rd Generation) communication system, an LTE (Long Term Evolution) communication system, and a 5G (5th Generation) communication system. The network 10 may include the Internet, a public wireless LAN (Local Area Network), any dedicated network and the like. Also, the vehicle 100 receives an other-vehicle emotion from the information management server 400 via the network 10. In this manner, a plurality of vehicles 100 may share the emotion of the occupant via the information management server 400.

The vehicle 100 may share the emotion of the occupant by performing wireless communication with another vehicle. The vehicle 100 may perform wireless communication with another vehicle through at least one of wireless communication with the another vehicle via the network 10, direct wireless communication with the another vehicle (which may be referred to as vehicle-to-vehicle direct communication) and wireless communication with the another vehicle via vehicle-to-infrastructure communication (which may be referred to as vehicle-infrastructure-vehicle communication). The vehicle 100 may perform vehicle-to-vehicle direct communication and vehicle-infrastructure-vehicle communication by using any known vehicle-to-vehicle communication and vehicle-to-infrastructure communication techniques. For example, the vehicle 100 performs vehicle-tovehicle direct communication and vehicle-infrastructure-vehicle communication through communication using predetermined frequency bands such as a 700-MHz band and a 5.8-GHz band. The vehicle 100 may perform wireless communication with another vehicle by way of yet another vehicle. For example, an inter-vehicle network may be formed by a plurality of vehicles 100 coordinating through vehicle-to-vehicle direct communication and vehicle-infrastructure-vehicle communication, and vehicles 100 at remote locations may communicate with each other via the inter-vehicle network.

While there are known techniques for displaying an other-vehicle emotion on a display according to operation of the occupant, it may be preferable to actively notify the occupant of the other-vehicle emotion from the vehicle 100 side in accordance with the situation. For example, when the subject vehicle drives slowly at the front position, the occupant of the subject vehicle may not recognize that an occupant of a following vehicle feels "irritated". In such cases, by notifying the occupant of the subject vehicle that the occupant of the following vehicle feels "irritated", the occupant of the subject vehicle can grasp the situation quickly.

The control apparatus 200 according to the present embodiment determines whether to perform notification to the occupant of the subject vehicle based on an other-vehicle emotion, and when determining to perform the notification, performs control to notify the occupant of the subject vehicle of notification information based on the other-vehicle emotion. For example, the control apparatus 200 determines to perform the notification when the occupant of a vehicle following the subject vehicle feels irritated, and notifies the driver of the subject vehicle that the occupant of the vehicle following the subject vehicle feels irritated by means of display, sound or the like. This enables the driver of the subject vehicle to take measures such as increasing the driving speed, making a lane change, and the like.

Figure 2:
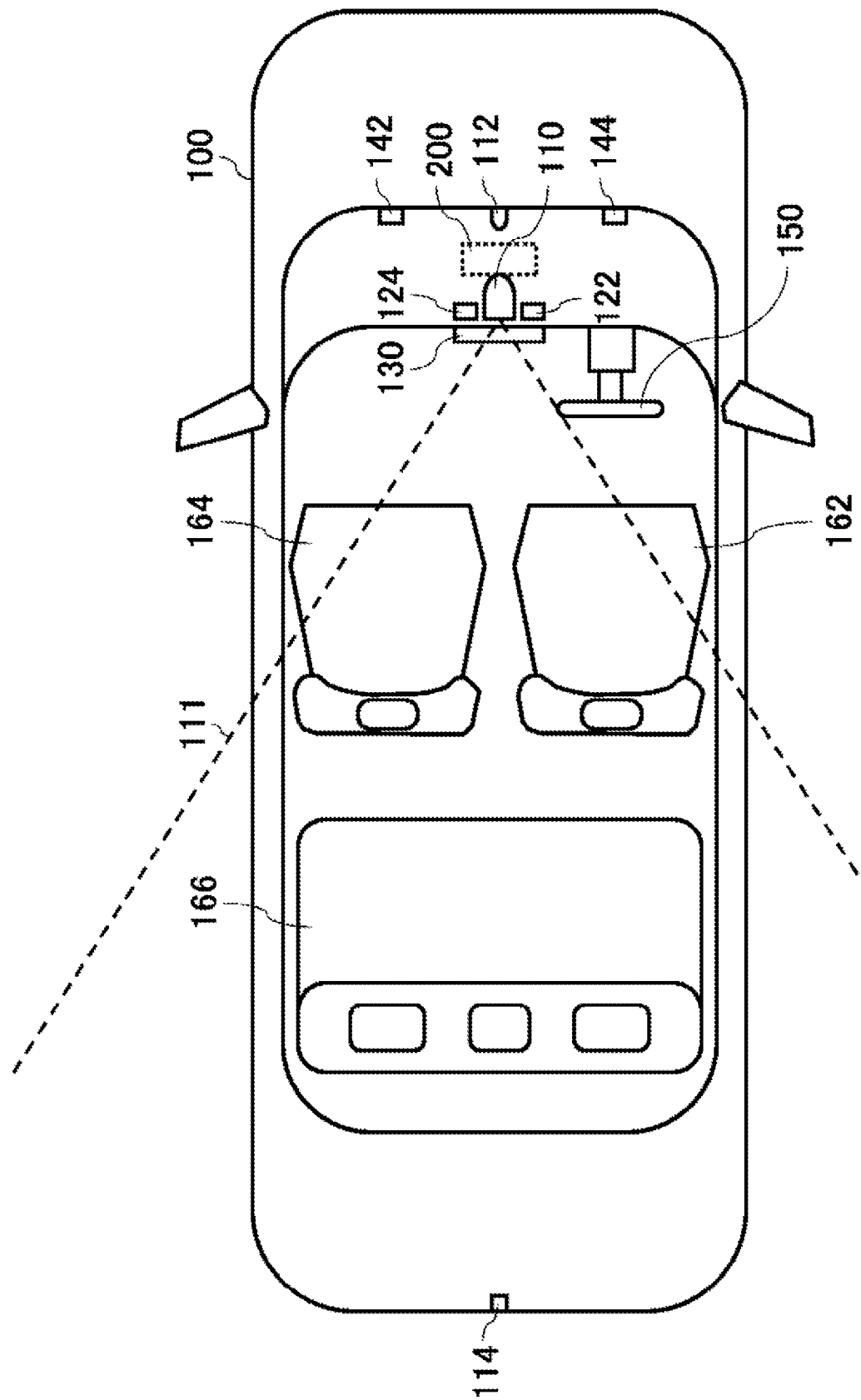
FIG. 2 schematically shows an example of configuration of the vehicle 100.

FIG. 2 schematically shows an example of configuration of the vehicle 100. The components shown in FIG. 2 may be a part of a navigation system included in the vehicle 100.

The vehicle 100 includes a camera 110. FIG. 2 shows an example in which the vehicle 100 includes the camera 110 that is capable of capturing images of all of the driver's seat 162, front passenger seat 164 and backseat 166. As indicated by an angle of view 111 shown in FIG. 2, the camera 110 is capable of capturing images of the occupants on the driver's seat 162, front passenger seat 164 and backseat 166. The arrangement of the camera 110 in FIG. 2 is an example, and the camera 110 may be arranged at any position as long as it can capture images of all of the driver's seat 162, front passenger seat 164 and backseat 166. Note that the vehicle 100 may include a plurality of cameras 110 for capturing respective ones of the driver's seat 162, front passenger seat 164 and backseat 166.

The vehicle 100 may include a camera 112 for capturing images ahead of the vehicle 100. The arrangement of the camera 112 in FIG. 2 is an example, and the camera 112 may be arranged at any position as long as it can capture images ahead of the vehicle 100. The camera 112 may be what is called a front camera. The camera 112 may also be what is called a dashboard camera.

The vehicle 100 may include a camera 114 for capturing images behind the vehicle 100. The arrangement of the camera 114 in FIG. 2 is an example, and the camera 114 may be arranged at any position as long as it can capture images behind the vehicle 100. The camera 114 may be what is called a rear camera. The camera 114 may also be what is called a back camera.

The vehicle 100 may include a microphone 122. FIG. 2 shows an example in which the vehicle 100 includes a microphone 122 that supports all of the driver's seat 162, front passenger seat 164 and backseat 166. The arrangement of the microphone 122 in FIG. 2 is an example, and the microphone 122 may be arranged at any position as long as it can pick up the voices of all the occupants on the driver's seat 162, front passenger seat 164 and backseat 166. The vehicle 100 may include a plurality of microphones 122. For example, the plurality of microphones 122 include a microphone 122 for the driver's seat 162, a microphone 122 for the front passenger seat 164 and a microphone 122 for the backseat 166.

The vehicle 100 includes a speaker 124. FIG. 2 shows an example in which the vehicle 100 includes the speaker 124 that supports all of the driver's seat 162, front passenger seat 164 and backseat 166. The arrangement of the speaker 124 in FIG. 2 is an example, and the speaker 124 may be arranged at any position. The vehicle 100 may include a plurality of speakers 124.

The vehicle 100 includes a display 130. The arrangement of the display 130 in FIG. 2 is an example, and the display 130 may be arranged at any position as long as it can be viewed mainly from the driver's seat 162 and front passenger seat 164. The display 130 may be a touchscreen display. The vehicle 100 may include a plurality of displays 130. For example, the vehicle 100 includes a display 130 for the driver's seat 162 and front passenger seat 164 and a display 130 for the backseat 166.

The vehicle 100 includes a wireless communication antenna 142. The wireless communication antenna 142 may be an antenna for performing communication via the network 10. For example, the vehicle 100 performs communication via the network 10 by way of a wireless base station, wireless router and the like in a mobile communication system by using the wireless communication antenna 142. The wireless communication antenna 142 may be an antenna for performing vehicle-to-vehicle communication, vehicle-to-infrastructure communication and the like.

The vehicle 100 includes a GPS (Global Positioning System) antenna 144. The GPS antenna 144 receives radio waves for position measurement from GPS satellites. The vehicle 100 may measure the current location of the vehicle 100 using the position-measurement radio waves received by the GPS antenna 144. The vehicle 100 may also use autonomous navigation in combination to measure the current location of the vehicle 100. The vehicle 100 may measure the current location of the vehicle 100 using any known position-measurement technique.

The vehicle 100 may include a sensor (not shown) capable of detecting biological information of the occupant of the vehicle 100. For example, the sensor is arranged at a steering wheel 150, the driver's seat 162, the front passenger seat 164, the backseat 166, or the like to detect biological information, such as heartbeat, pulse rate, sweating, blood pressure and body temperature, of the occupant. The vehicle 100 may include a short-range wireless communication unit communicatively connected to a wearable device worn by the occupant, and may receive, from the wearable device, biological information of the occupant detected by the wearable device. For example, the short-range wireless communication unit is communicatively connected to the wearable device via Bluetooth or the like.

The above-mentioned components may be included in the control apparatus 200. The control apparatus 200 may be integrated with or separated from a navigation system included in the vehicle 100.

Figure 3:
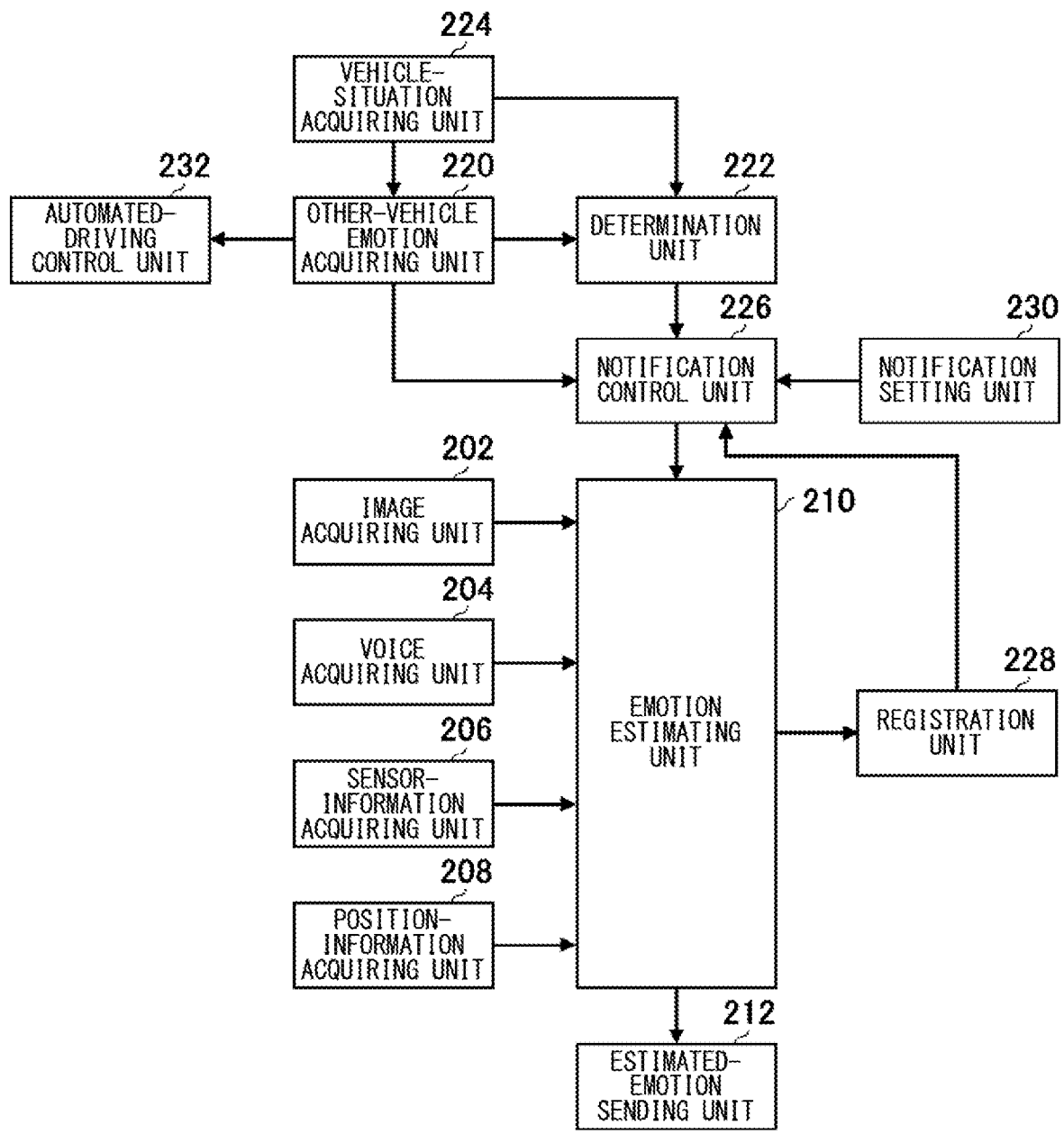
FIG. 3 schematically shows an example of functional configuration of a control apparatus 200.

FIG. 3 schematically shows an example of functional configuration of the control apparatus 200. The control apparatus 200 includes an image acquiring unit 202, a voice acquiring unit 204, a sensor-information acquiring unit 206, a position-information acquiring unit 208, an emotion estimating unit 210, an estimated-emotion sending unit 212, an other-vehicle emotion acquiring unit 220, a determination unit 222, a vehicle-situation acquiring unit 224, a notification control unit 226, a registration unit 228, a notification setting unit 230 and an automated-driving control unit 232. Note that the control apparatus 200 may not necessarily include all of these components.

The image acquiring unit 202 acquires an image of an occupant of the vehicle 100. The image acquiring unit 202 acquires an image of the occupant captured by the image-capturing unit of the vehicle 100. The image acquiring unit 202 may continuously acquire images of the occupant captured by the image-capturing unit of the vehicle 100.

The voice acquiring unit 204 acquires a voice of an occupant of the vehicle 100. The voice acquiring unit 204 acquires a voice of the occupant input from the microphone 122 of the vehicle 100. The voice acquiring unit 204 may continuously acquire voices of the occupant from the microphone 122 of the vehicle 100.

The sensor-information acquiring unit 206 acquires biological information of an occupant of the vehicle 100 detected by a sensor. For example, the sensor-information acquiring unit 206 acquires, from a sensor arranged at the steering wheel 150, the driver's seat 162, the front passenger seat 164, the backseat 166, or the like, biological information, such as heartbeat, pulse rate, sweating, blood pressure and body temperature, of the occupant detected by the sensor. Also, for example, the sensor-information acquiring unit 206 acquires, from a wearable device worn by the occupant, biological information, such as heartbeat, pulse rate, sweating, blood pressure and body temperature, of the occupant detected by the wearable device.

The position-information acquiring unit 208 acquires position information of the vehicle 100. The position-information acquiring unit 208 may acquire position information of the vehicle 100 derived by using position-measurement radio waves received by the GPS antenna 144. The derivation of the position information of the vehicle 100 may be performed by a navigation system of the vehicle 100. The derivation may also be performed by the position-information acquiring unit 208 by using information received by the GPS antenna 144.

The emotion estimating unit 210 estimates the emotion of an occupant by performing emotion estimation processing. The emotion estimating unit 210 may perform the emotion estimation processing by using the image of the occupant acquired by the image acquiring unit 202. The emotion estimating unit 210 may perform the emotion estimation processing by using the voice of the occupant acquired by the voice acquiring unit 204. The emotion estimating unit 210 may perform the emotion estimation processing by using the plurality of types of biological information acquired by the sensor-information acquiring unit 206. The emotion estimating unit 210 may perform the emotion estimation processing by using two or more of the image of the occupant, the voice of the occupant and the plurality of types of biological information of the occupant.

The estimated-emotion sending unit 212 sends the emotion of the occupant estimated by the emotion estimating unit 210. For example, the estimated-emotion sending unit 212 sends the emotion of the occupant to the information management server 400 via the network 10. The estimated-emotion sending unit 212 may also send the emotion of the occupant to another vehicle 100 via the network 10. The estimated-emotion sending unit 212 may also send the emotion of the occupant to another vehicle 100 through vehicle-to-vehicle direct communication. The estimated-emotion sending unit 212 may also send the emotion of the occupant to another vehicle 100 through vehicle-infrastructure-vehicle communication. The estimated-emotion sending unit 212 may also send the emotion of the occupant to another vehicle 100 via an inter-vehicle network.

The estimated-emotion sending unit 212 may regularly send the emotion of the occupant estimated by the emotion estimating unit 210. The timing of sending the emotion of the occupant by the estimated-emotion sending unit 212 may be set as required. The estimated-emotion sending unit 212 may also send the emotion of the occupant to another vehicle in response to a request from the another vehicle.

The other-vehicle emotion acquiring unit 220 acquires an other-vehicle emotion indicating the emotion of an occupant of another vehicle 100. For example, the other-vehicle emotion acquiring unit 220 receives, from another vehicle 100, an other-vehicle emotion indicating the emotion of an occupant of the another vehicle 100. Also, for example, the other-vehicle emotion acquiring unit 220 receives the other-vehicle emotion from the information management server 400.

For example, the other-vehicle emotion acquiring unit 220 acquires a following-vehicle emotion indicating the emotion of an occupant of a vehicle following the subject vehicle. In the present embodiment, a vehicle following one vehicle may refer to a single vehicle that drives following the one vehicle without intervention of another vehicle. The other-vehicle emotion acquiring unit 220 may receive emotions regularly sent from the following vehicle. The other-vehicle emotion acquiring unit 220 may also send a request to the following vehicle to receive the following-vehicle emotion from the following vehicle. The other-vehicle emotion acquiring unit 220 may also request the following-vehicle emotion from the information management server 400 to receive the following-vehicle emotion from the information management server 400.

For example, the other-vehicle emotion acquiring unit 220 acquires other-vehicle emotions indicating the emotions of occupants of respective ones of a plurality of vehicles successively following the subject vehicle. A plurality of vehicles successively following one vehicle may refer to a plurality of vehicles forming a line that follows the one vehicle. For example, the other-vehicle emotion acquiring unit 220 acquires other-vehicle emotions indicating the emotions of occupants of respective ones of a plurality of vehicles located within a predetermined distance from the subject vehicle in the plurality of vehicles successively following the subject vehicle. Also, for example, the other-vehicle emotion acquiring unit 220 acquires other-vehicle emotions indicating the emotions of occupants of respective ones of a predetermined number of vehicles located closer to the subject vehicle in the plurality of vehicles successively following the subject vehicle. The other-vehicle emotion acquiring unit 220 may receive the other-vehicle emotions of the plurality of vehicles from the plurality of vehicles. The other-vehicle emotion acquiring unit 220 may also request the other-vehicle emotions of the plurality of vehicles from the information management server 400 to receive the other-vehicle emotions of the plurality of vehicles from the information management server 400.

For example, the other-vehicle emotion acquiring unit 220 acquires a preceding-vehicle emotion indicating the emotion of an occupant of a vehicle preceding the subject vehicle. In the present embodiment, a vehicle preceding one vehicle may refer to a single vehicle that drives ahead of the one vehicle without intervention of another vehicle. The other-vehicle emotion acquiring unit 220 may receive emotions regularly sent from the preceding vehicle. The other-vehicle emotion acquiring unit 220 may also send a request to the preceding vehicle to receive the preceding-vehicle emotion from the preceding vehicle. The other-vehicle emotion acquiring unit 220 may also request the preceding-vehicle emotion from the information management server 400 to receive the preceding-vehicle emotion from the information management server 400.

For example, the other-vehicle emotion acquiring unit 220 acquires other-vehicle emotions indicating the emotions of occupants of respective ones of a plurality of vehicles successively preceding the subject vehicle. A plurality of vehicles successively preceding one vehicle may refer to a plurality of vehicles forming a line that precedes the one vehicle. For example, the other-vehicle emotion acquiring unit 220 acquires other-vehicle emotions indicating the emotions of occupants of respective ones of a plurality of vehicles located within a predetermined distance from the subject vehicle in the plurality of vehicles successively preceding the subject vehicle. Also, for example, the other-vehicle emotion acquiring unit 220 acquires other-vehicle emotions indicating the emotions of occupants of respective ones of a predetermined number of vehicles located closer to the subject vehicle in the plurality of vehicles successively preceding the subject vehicle. The other-vehicle emotion acquiring unit 220 may receive the other-vehicle emotions of the plurality of vehicles from the plurality of vehicles. The other-vehicle emotion acquiring unit 220 may also request the other-vehicle emotions of the plurality of vehicles from the information management server 400 to receive the other-vehicle emotions of the plurality of vehicles from the information management server 400.

The determination unit 222 determines whether to perform notification to an occupant of the subject vehicle based on the other-vehicle emotion acquired by the other-vehicle emotion acquiring unit 220. For example, the determination unit 222 determines not to perform the notification when the other-vehicle emotion is a positive emotion, and determines to perform the notification when the other-vehicle emotion is a negative emotion.

An example of negative emotions is anger. An example of negative emotions is disgust. An example of negative emotions is irritation. An example of negative emotions is fear.

An example of positive emotions is joy. An example of positive emotions is pleasure. An example of positive emotions is enjoyment. An example of positive emotions is peacefulness. An example of positive emotions is thankfulness.

The negative emotions and positive emotions may be defined according to any model. For example, those emotions in Russell's circumplex model that are on the "Unpleasure" side and on the "Pleasure" side may be negative emotions and positive emotions, respectively.

The vehicle-situation acquiring unit 224 acquires a situation of the vehicle 100. For example, the vehicle-situation acquiring unit 224 acquires a surrounding situation of the vehicle 100. The vehicle-situation acquiring unit 224 may acquire a situation behind the vehicle 100. The vehicle-situation acquiring unit 224 may acquire the situation behind the vehicle 100 based on an image captured by the camera 114. The vehicle-situation acquiring unit 224 may acquire a situation ahead of the vehicle 100. The vehicle-situation acquiring unit 224 may acquire the situation ahead of the vehicle 100 based on an image captured by the camera 112.

The vehicle-situation acquiring unit 224 may detect a change in the surrounding situation of the vehicle 100. For example, the vehicle-situation acquiring unit 224 detects a change behind the vehicle 100. The vehicle-situation acquiring unit 224 may detect a change behind the vehicle 100 based on images continuously captured by the camera 114.

As a specific example, the vehicle-situation acquiring unit 224 detects that the vehicle behind the vehicle 100 changes. For example, the vehicle-situation acquiring unit 224 detects that the vehicle behind the vehicle 100 changes when another vehicle makes a lane change and comes behind the vehicle 100. Also, for example, the vehicle-situation acquiring unit 224 detects that the vehicle behind the vehicle 100 changes when the vehicle 100 makes a lane change. Also, as a specific example, the vehicle-situation acquiring unit 224 detects that another vehicle approaches the subject vehicle from behind.

Also, for example, the vehicle-situation acquiring unit 224 detects a change ahead of the vehicle 100. The vehicle-situation acquiring unit 224 may detect a change ahead of the vehicle 100 based on images continuously captured by the camera 112.

As a specific example, the vehicle-situation acquiring unit 224 detects that the vehicle ahead of the vehicle 100 changes. For example, the vehicle-situation acquiring unit 224 detects that the vehicle ahead of the vehicle 100 changes when another vehicle makes a lane change and comes ahead of the vehicle 100. Also, for example, the vehicle-situation acquiring unit 224 detects that the vehicle ahead of the vehicle 100 changes when the vehicle 100 makes a lane change.

The other-vehicle emotion acquiring unit 220 may acquire an other-vehicle emotion based on the situation of the vehicle 100 acquired by the vehicle-situation acquiring unit 224 and on a change in the surrounding situation of the vehicle 100 detected by the vehicle-situation acquiring unit 224. For example, when the vehicle-situation acquiring unit 224 detects that the vehicle behind the vehicle 100 changes, the other-vehicle emotion acquiring unit 220 acquires a following-vehicle emotion. Also, for example, when the vehicle-situation acquiring unit 224 detects that another vehicle approaches the subject vehicle from behind, the other-vehicle emotion acquiring unit 220 acquires a following-vehicle emotion. Also, for example, when the vehicle-situation acquiring unit 224 detects that the vehicle ahead of the vehicle 100 changes, the other-vehicle emotion acquiring unit 220 acquires a preceding-vehicle emotion.

When the determination unit 222 determines to perform the notification, the notification control unit 226 performs control to notify the occupant of the subject vehicle of notification information based on the other-vehicle emotion. For example, the notification control unit 226 controls the speaker 124 to notify the occupant of the subject vehicle of notification information by means of sound. Also, for example, the notification control unit 226 controls the display 130 to notify the occupant of the subject vehicle of notification information by means of display.

For example, when the determination unit 222 determines to perform the notification due to the following-vehicle emotion being a negative emotion, the notification control unit 226 may perform control to notify the occupant of the subject vehicle of notification information including the following-vehicle emotion. In this manner, for example, when the occupant of the following vehicle has a negative emotion due to a lane change of the subject vehicle, the occupant of the subject vehicle can quickly recognize that. Also, for example, when the occupant of the vehicle approaching the subject vehicle from behind have a negative emotion, the occupant of the subject vehicle can quickly recognize that. The notification control unit 226 does not perform the notification when the determination unit 222 determines not to perform the notification due to the following-vehicle emotion being a positive emotion. This can appropriately reduce the number of times of performing the notification as compared to the case of always notifying the other-vehicle emotion, so that the occupant of the subject vehicle is less prone to become insensitive to the notification. Also, the notification can be performed only for situations in which it is highly needed. Also, the number of times of performing the notification processing can be appropriately reduced, thereby reducing the processing load for the notification processing.

When the determination unit 222 determines to perform the notification due to the following-vehicle emotion being a negative emotion, the notification control unit 226 may perform control to notify the occupant of the subject vehicle of notification information prompting the occupant of the subject vehicle to perform at least one of making a lane change, resetting a route and taking a rest. For example, the notification control unit 226 performs control to notify the occupant of the subject vehicle of notification information prompting to make a lane change. For example, the notification control unit 226 performs control to notify the occupant of the subject vehicle of notification information prompting to reset a route. For example, the notification control unit 226 performs control to notify the occupant of the subject vehicle of notification information prompting to take a rest. Depending on the personality of the occupant of the subject vehicle or the like, directly notifying that the following-vehicle emotion is negative may cause the occupant of the subject vehicle to cower unnecessarily. However, indirect notification as above can lead the subject vehicle and a vehicle whose occupant has a negative emotion to be distanced without causing the occupant of the subject vehicle to cower unnecessarily.

When the determination unit 222 determines to perform the notification due to the preceding-vehicle emotion being a negative emotion, the notification control unit 226 may perform control to notify the occupant of the subject vehicle of notification information recommending not to overtake the preceding vehicle. For example, when the preceding-vehicle emotion is irritation or anger, the notification control unit 226 performs control to notify the occupant of the subject vehicle of notification information recommending not to overtake the preceding vehicle. This can prevent unnecessary trouble that would otherwise be caused by overtaking the preceding vehicle whose occupant is irritated or angry.

For example, when the proportion of negative other-vehicle emotions in a plurality of other-vehicle emotions of a plurality of vehicles successively following the subject vehicle is larger than a predetermined proportion, the determination unit 222 may determine to perform the notification. For example, when five vehicles successively follow the subject vehicle and the other-vehicle emotions of three or more of the five vehicles are negative emotions, the determination unit 222 determines to perform the notification. In this case, the notification control unit 226 may perform control to notify the occupant of the subject vehicle of notification information indicating that the other-vehicle emotions of the plurality of vehicles are negative. For example, notification control unit 226 performs control to notify the occupant of the subject vehicle of notification information notifying that occupants of a majority of the plurality of following vehicles have negative emotions. In this manner, the occupant of the subject vehicle can recognize that the occupants of the following vehicles may have negative emotions due to the subject vehicle without notifying the individuals' emotions.

For example, when the difference between the following-vehicle emotion and the preceding-vehicle emotion meets a predetermined condition, the determination unit 222 determines to perform the notification. For example, the determination unit 222 determines not to perform the notification when the following-vehicle emotion and the preceding-vehicle emotion are the same type of emotions, and determines to perform the notification when the following-vehicle emotion and the preceding-vehicle emotion are different in type. For example, comparing the case in which the following-vehicle emotion is irritation and the preceding-vehicle emotion is enjoyment and the case in which the following-vehicle emotion and the preceding-vehicle emotion are both irritation, the former is more likely that the irritation is due to the subject vehicle. Thus, by performing the above-described determination by the determination unit 222, the notification can be performed when it is likely that the irritation is due to the subject vehicle, so that the occupant of the subject vehicle can quickly grasp the situation.

For example, when one of the following-vehicle emotion and the preceding-vehicle emotion is a positive emotion and the other is a negative emotion, the determination unit 222 may determine to perform the notification. When the following-vehicle emotion is a negative emotion and the preceding-vehicle emotion is a positive emotion, the notification control unit 226 may perform control to notify the occupant of the subject vehicle of notification information based on the following-vehicle emotion. In this manner, the occupant of the subject vehicle can quickly recognize that the occupant of the following vehicle may have a negative emotion due to the subject vehicle. Behaviors that can cause negative emotions may include "erratic" driving, repeated sudden stops, sudden cutting-in, taking a too long distance from the preceding vehicle, and the like.

When the following-vehicle emotion is a positive emotion and the preceding-vehicle emotion is a negative emotion, the notification control unit 226 may perform control to notify the occupant of the subject vehicle of notification information based on the preceding-vehicle emotion. In this manner, the occupant of the subject vehicle can quickly recognize that the occupant of the preceding vehicle may have a negative emotion due to the subject vehicle. Behaviors that can cause negative emotions may include the subject vehicle taking a too short distance from the preceding vehicle, turning on the high beams of the headlights of the subject vehicle, and the like.

For example, when the following-vehicle emotion and the preceding-vehicle emotion are the same type of emotions and their difference in degree of emotion is larger than a predetermined threshold, the determination unit 222 may determine to perform the notification. For example, when the following-vehicle emotion and the preceding-vehicle emotion are both irritation and their difference in degree of emotion is smaller than a predetermined threshold, the determination unit 222 determines not to perform the notification. This can prevent notifying that the following-vehicle emotion and the preceding-vehicle emotion are anger when the preceding vehicle, the subject vehicle and the following vehicle are all caught in a traffic jam and the irritation is not due to the subject vehicle, for example. For example, when the following-vehicle emotion and the preceding-vehicle emotion are both irritation and their difference in degree of emotion is larger than a predetermined threshold, the determination unit 222 determines to perform the notification. In this manner, for example, when the preceding vehicle, the subject vehicle, and the following vehicle are all caught in a traffic jam and the occupant of the preceding vehicle or the occupant of the following vehicle feels irritated due to the subject vehicle, the occupant of the subject vehicle can quickly recognize that.

When the notification control unit 226 notifies the occupant of the subject vehicle of notification information indicating that the other-vehicle emotion is a negative emotion, the registration unit 228 acquires emotions of the occupant before and after the notification from the emotion estimating unit 210. When an amount of change between the emotions before and after the notification is larger than a predetermined threshold, the registration unit 228 registers the occupant as an occupant not to be notified of notification information indicating that the other-vehicle emotion is a negative emotion.

When the other-vehicle emotion is a negative emotion and the occupant of the subject vehicle is not registered as an occupant not to be notified of notification information, the notification control unit 226 may perform control to notify the occupant of the subject vehicle of notification information including the other-vehicle emotion. When the other-vehicle emotion is a negative emotion and the occupant of the subject vehicle is registered as an occupant not to be notified of notification information, the notification control unit 226 does not notify the occupant of the subject vehicle of notification information including the other-vehicle emotion. For example, this can prevent the occupant of the subject vehicle from being unnecessarily shaken as a result of notifying the occupant of the subject vehicle of the other-vehicle emotion indicating a negative emotion.

The notification setting unit 230 performs settings relating to notification control performed by the notification control unit 226. For example, the notification setting unit 230 performs a setting to perform notification based on a determination result of the determination unit 222, a setting to always notify the emotion acquired by the other-vehicle emotion acquiring unit 220, a setting to notify the other-vehicle emotion acquired by the other-vehicle emotion acquiring unit 220 at a specified timing, and the like. When the notification setting unit 230 sets to always notify the emotion acquired by the other-vehicle emotion acquiring unit 220, the notification control unit 226 may perform control to notify the occupant of the subject vehicle of the other-vehicle emotion acquired by the other-vehicle emotion acquiring unit 220 regardless of the determination result of the determination unit 222. Also, when the notification setting unit 230 sets to notify the emotion acquired by the other-vehicle emotion acquiring unit 220 at a specified timing, the notification control unit 226 may perform control to notify the occupant of the subject vehicle of the other-vehicle emotion acquired by the other-vehicle emotion acquiring unit 220 as specified by the occupant of the subject vehicle regardless of the determination result of the determination unit 222.

The notification setting unit 230 may perform settings according to an instruction from the occupant of the subject vehicle. For example, the notification setting unit 230 may receive an instruction from the occupant of the subject vehicle via the display 130. As a specific example, the notification setting unit 230 receives an instruction from the occupant of the subject vehicle through operations on buttons for various settings displayed on the display 130. Also, for example, the notification setting unit 230 may receive an instruction from the occupant of the subject vehicle via the microphone 122.

If the vehicle 100 is an automated driving vehicle, the automated-driving control unit 232 controls the automated driving of the vehicle 100. If the vehicle 100 is not an automated driving vehicle, the control apparatus 200 may not include the automated-driving control unit 232.

For example, when the preceding-vehicle emotion of the vehicle preceding the vehicle 100 acquired by the other-vehicle emotion acquiring unit 220 is a negative emotion, the automated-driving control unit 232 controls the automated driving of the vehicle 100 such that the vehicle 100 does not overtake the preceding vehicle. This, for example, can prevent trouble that would otherwise be caused by overtaking the preceding vehicle whose occupant is irritated.

Also, for example, when the following-vehicle emotion of the vehicle following the vehicle 100 acquired by the other-vehicle emotion acquiring unit 220 is a negative emotion, the automated-driving control unit 232 controls the automated driving of the vehicle 100 such that the vehicle 100 makes a lane change. This, for example, can prevent trouble that would otherwise be caused by driving ahead of a vehicle whose occupant is irritated.

Figure 4:
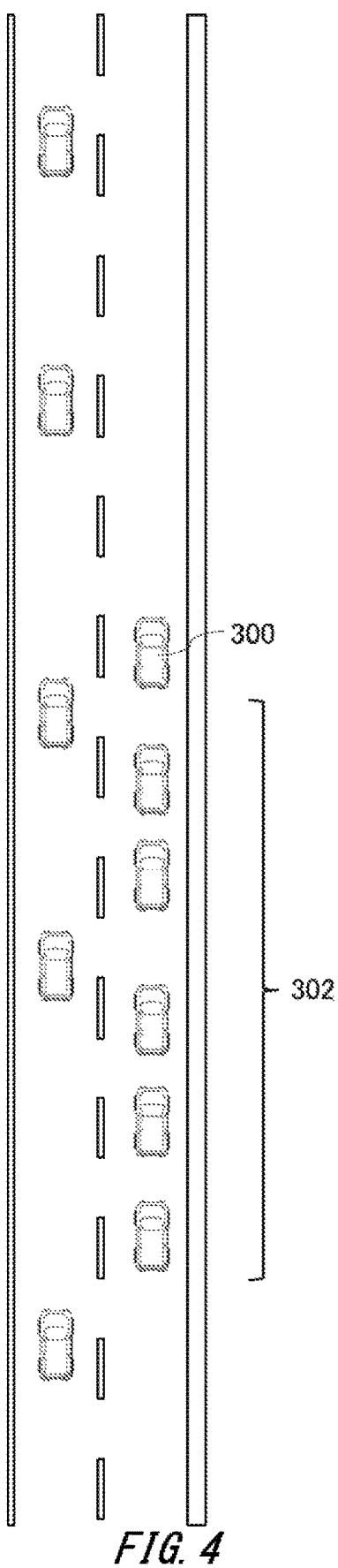
FIG. 4 schematically shows an example of a driving situation of a subject vehicle 300.

FIG. 4 schematically shows an example of a driving situation of a subject vehicle 300. The following describes a case of determining whether to perform notification based on the emotions of occupants of a group of following vehicles 302 successively following the subject vehicle 300.

The other-vehicle emotion acquiring unit 220 included in the control apparatus 200 of the subject vehicle 300 acquires, from respective ones of the group of following vehicles 302 successively following the subject vehicle 300, other-vehicle emotions indicating the emotions of the respective occupants. For example, the other-vehicle emotion acquiring unit 220 receives the other-vehicle emotions from respective ones of the group of following vehicles 302 via vehicle-to-vehicle direct communication.

When the proportion of negative emotions in the plurality of other-vehicle emotions of the group of following vehicles 302 is larger than a predetermined proportion, the determination unit 222 may determine to perform the notification and, when not, determine not to perform notification. For example, assuming the predetermined proportion is 50% in the example shown in FIG. 4, when the occupants of three or more of the five vehicles have negative emotions, the determination unit 222 determines to perform the notification. When the determination unit 222 determines to perform the notification, the notification control unit 226 may perform control to notify the occupant of the subject vehicle 300 of notification information indicating that the occupants of a plurality of vehicles following the subject vehicle 300 have negative emotions.

In this manner, for example, when the occupants of a plurality of vehicles following the subject vehicle 300 have negative emotions such as irritation due to the slow driving of the subject vehicle 300 or the like, the occupant of the subject vehicle 300 can quickly recognize that. Also, the collective emotion of the occupants of the plurality of vehicles following the subject vehicle 300 can be notified, so that individuals' information is not notified.

When the occupants of two or less of the five vehicles have negative emotions, the determination unit 222 determines not to perform the notification. This can prevent notifying the occupant of the subject vehicle 300 that the emotions of the group of following vehicles 302 are negative when the occupants of a minority of the group of following vehicles 302 have negative emotions accidentally, irrespective of the driving of the subject vehicle 300.

Figure 5:
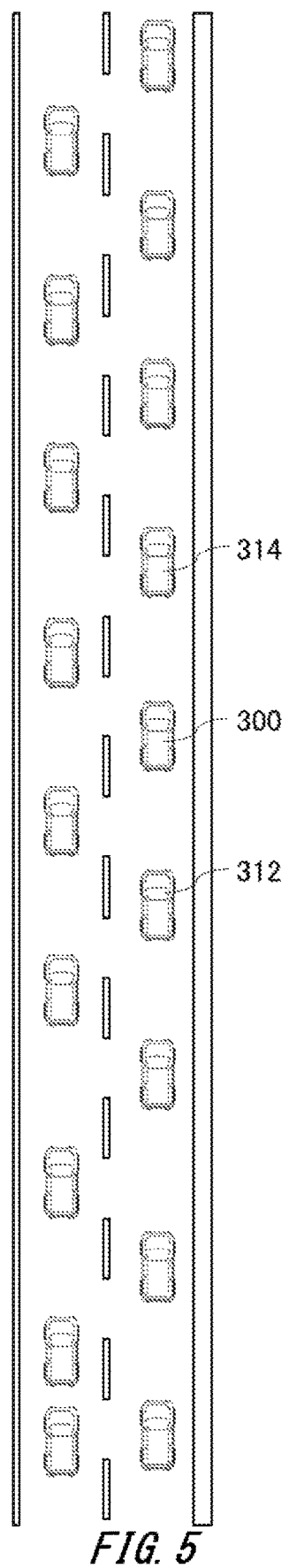
FIG. 5 schematically shows an example of a driving situation of the subject vehicle 300.

FIG. 5 schematically shows an example of a driving situation of the subject vehicle 300. The following describes a case of determining whether to perform the notification based on the difference between a following-vehicle emotion indicating the emotion of a vehicle 312 following the subject vehicle 300 and a preceding-vehicle emotion indicating the emotion of a vehicle 314 preceding the subject vehicle 300.

For example, the other-vehicle emotion acquiring unit 220 included in the control apparatus 200 of the subject vehicle 300 receives the following-vehicle emotion from the following vehicle 312 and receives the preceding-vehicle emotion from the preceding vehicle 314. For example, the other-vehicle emotion acquiring unit 220 may receive the following-vehicle emotion and the preceding-vehicle emotion from the respective ones of the following vehicle 312 and the preceding vehicle 314 via vehicle-to-vehicle direct communication.

For example, the determination unit 222 determines not to perform the notification when the following-vehicle emotion and the preceding-vehicle emotion are the same type of emotions, and determines to perform the notification when the following-vehicle emotion and the preceding-vehicle emotion are different in type. In this manner, for example, when the following-vehicle emotion and the preceding-vehicle emotion are irritation, and the irritation is due to a traffic jam or the like and not the driving of the subject vehicle 300, the notification can be prevented from being performed. Also, for example, when the preceding-vehicle emotion is enjoyment while the following-vehicle emotion is irritation, and the irritation of the occupant of the following vehicle may be due to the driving of the subject vehicle 300, the occupant of the subject vehicle 300 can quickly recognize that.

Figure 6:
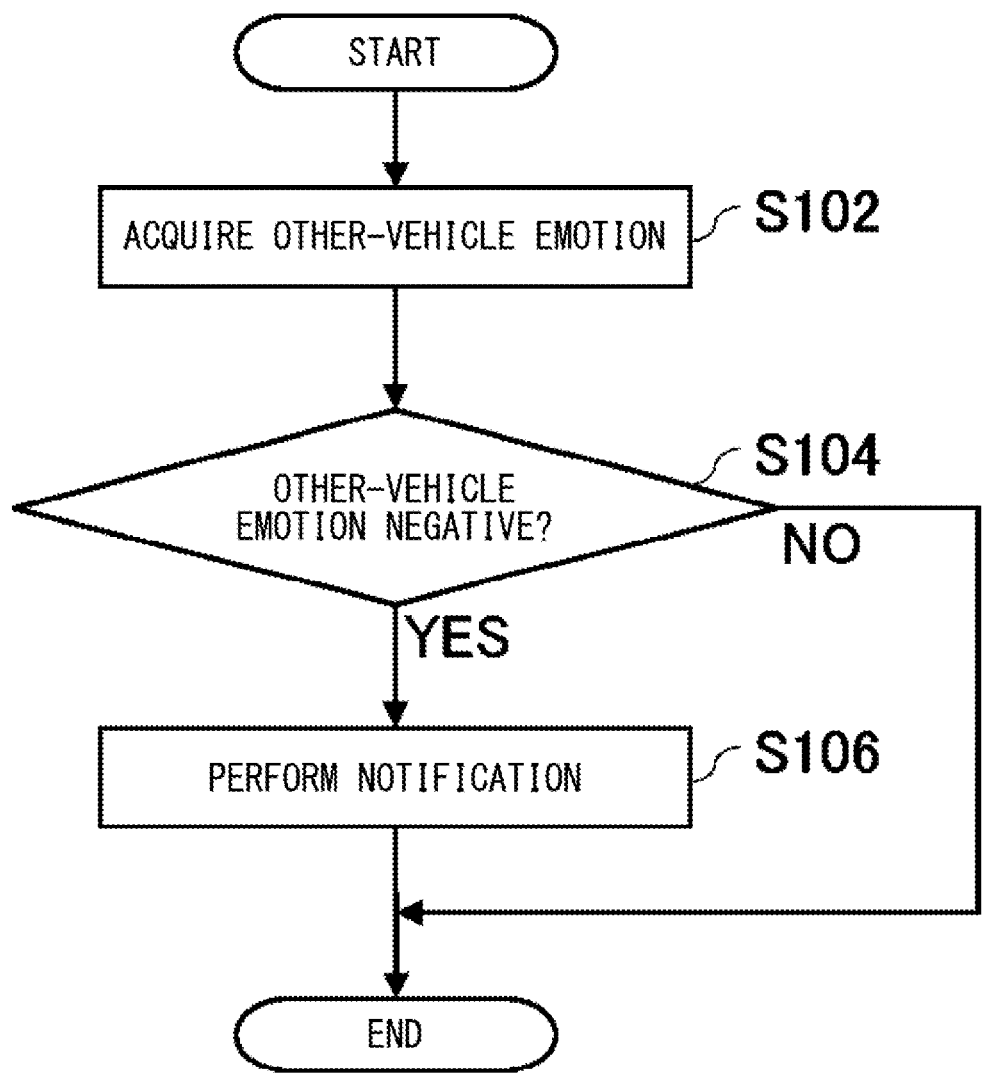
FIG. 6 schematically shows an example of a processing flow of the control apparatus 200.

FIG. 6 schematically shows an example of a processing flow of the control apparatus 200. The following describes an example of a processing flow when a change occurs in a vehicle ahead of or behind the subject vehicle, such as when the subject vehicle makes a lane change, another vehicle makes a lane change and comes ahead of or behind the subject vehicle, another vehicle approaches the subject vehicle from behind, or the like.

In Step (a Step may be abbreviated as S) 102, the other-vehicle emotion acquiring unit 220 acquires an other-vehicle emotion indicating the emotion of an occupant of a vehicle newly located ahead of or behind the subject vehicle. In S104, the other-vehicle emotion acquiring unit 220 determines whether the other-vehicle emotion acquired in S102 is a negative emotion. When it is determined as a negative emotion, the process proceeds to S106, and when it is determined as not a negative emotion, the process ends.

In S106, the notification control unit 226 performs control to notify the occupant of the subject vehicle of notification information including the other-vehicle emotion. For example, the notification control unit 226 controls the speaker 124 and the display 130 to notify the occupant of the subject vehicle that the occupant of the vehicle newly located ahead of or behind the subject vehicle has a negative emotion.

Figure 7:
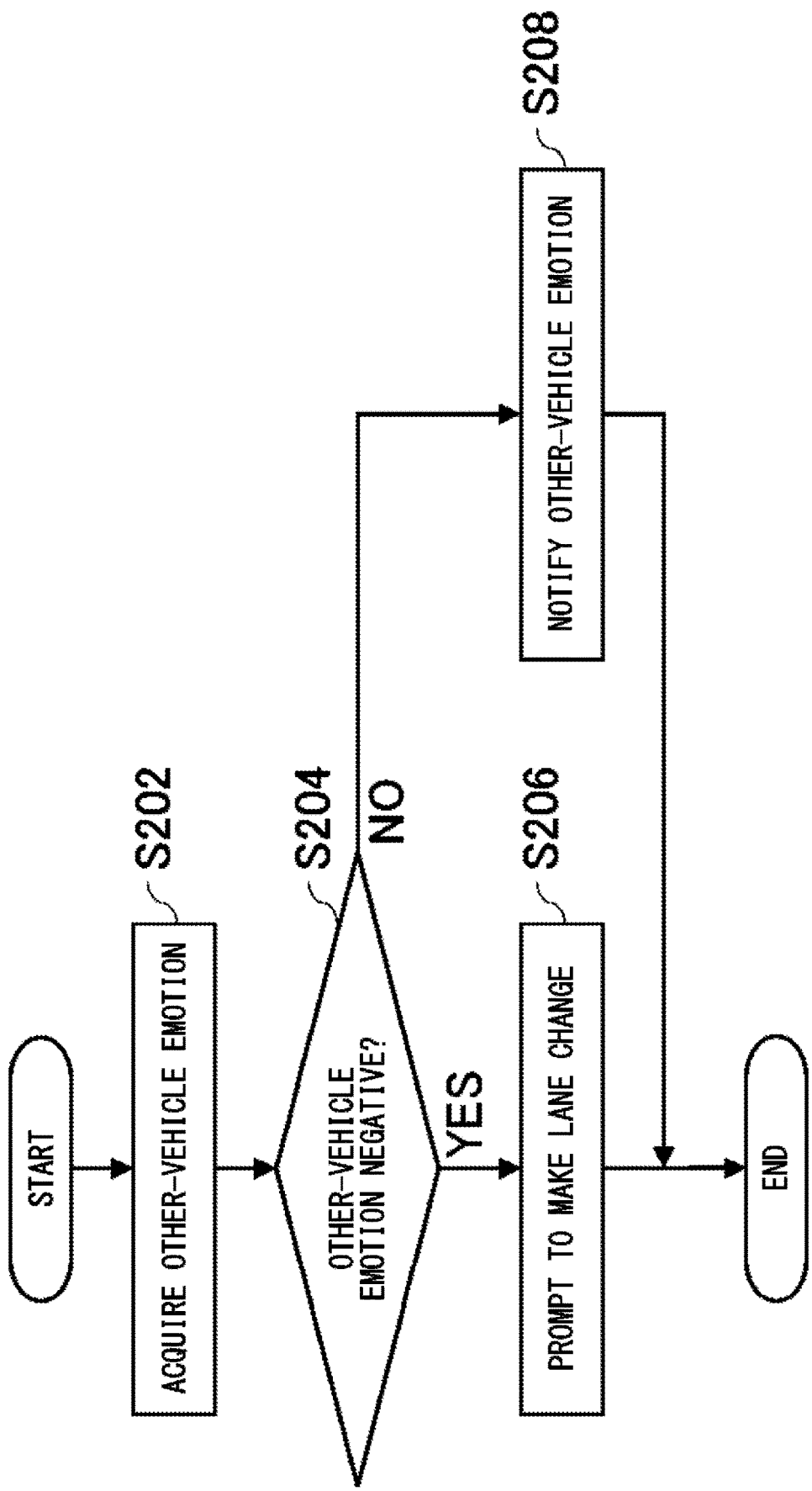
FIG. 7 schematically shows an example of a processing flow of the control apparatus 200.

FIG. 7 schematically shows an example of a processing flow of the control apparatus 200. The following describes another example of a processing flow when a change occurs in a vehicle ahead of or behind the subject vehicle, such as when the subject vehicle makes a lane change, another vehicle makes a lane change and comes ahead of or behind the subject vehicle, another vehicle approaches the subject vehicle from behind, or the like.

In S202, the other-vehicle emotion acquiring unit 220 acquires an other-vehicle emotion indicating the emotion of an occupant of a vehicle newly located ahead of or behind the subject vehicle. In S204, the other-vehicle emotion acquiring unit 220 determines whether the other-vehicle emotion acquired in S202 is a negative emotion. When it is determined as a negative emotion, the process proceeds to S206, and when it is determined as not a negative emotion, the process proceeds to S208.

In S206, the notification control unit 226 performs control to notify the occupant of the subject vehicle of notification information prompting to make a lane change. For example, the notification control unit 226 controls the speaker 124 and the display 130 to suggest changing lanes.

In S208, the notification control unit 226 performs control to notify the occupant of the subject vehicle of notification information including the other-vehicle emotion. For example, the notification control unit 226 controls the speaker 124 and the display 130 to notify the occupant of the subject vehicle that the occupant of the vehicle newly located ahead of or behind the subject vehicle has a positive emotion.

Figure 8:
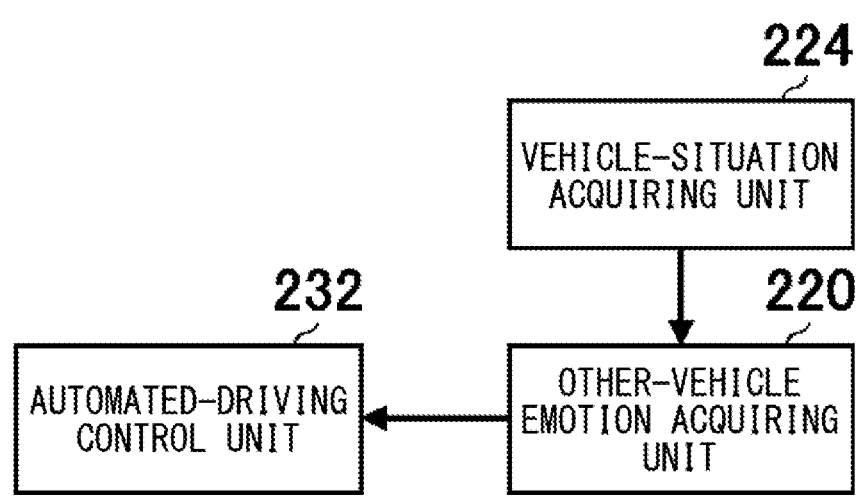
FIG. 8 schematically shows another example of functional configuration of the control apparatus 200.

FIG. 8 schematically shows another example of functional configuration of the control apparatus 200. The control apparatus 200 shown in the example of FIG. 8 is provided in the vehicle 100 that is an automated driving vehicle, and includes an other-vehicle emotion acquiring unit 220, a vehicle-situation acquiring unit 224 and an automated-driving control unit 232.

For example, in the control apparatus 200 shown in FIG. 8, the other-vehicle emotion acquiring unit 220 acquires a preceding-vehicle emotion indicating the emotion of an occupant of a vehicle preceding the vehicle 100. When the preceding-vehicle emotion is a negative emotion, the automated-driving control unit 232 controls the automated driving of the vehicle 100 such that the vehicle 100 does not overtake the preceding vehicle.

Also, for example, in the control apparatus 200 shown in FIG. 8, the other-vehicle emotion acquiring unit 220 acquires a following-vehicle emotion indicating the emotion of an occupant of a vehicle following the vehicle 100. When the following-vehicle emotion is a negative emotion, the automated-driving control unit 232 controls the automated driving of the vehicle 100 such that the vehicle 100 makes a lane change.

While the control apparatus 200 is provided in the vehicle 100 in the examples mainly described in the above embodiments, the control apparatus 200 is not so limited. The control apparatus 200 may be located external to the vehicle 100. For example, the control apparatus 200 may be located on the network 10, and control the vehicle 100 via the network 10. The vehicle 100 controlled by the control apparatus 200 may be an example of a first vehicle.

Figure 9:
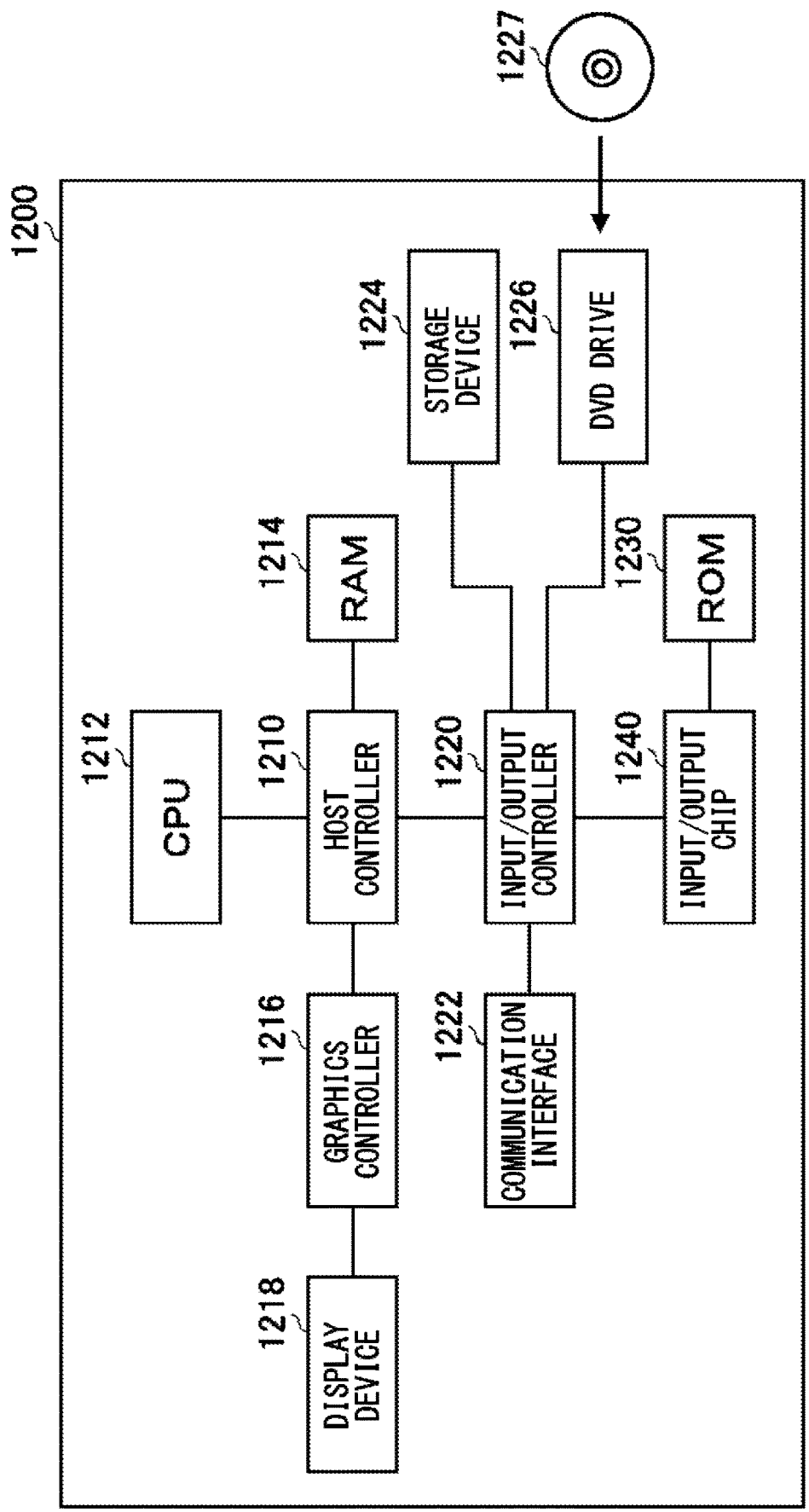
FIG. 9 schematically shows an example of hardware configuration of a computer 1200 that functions as the control apparatus 200.

FIG. 9 schematically shows an example of hardware configuration of a computer 1200 that functions as the control apparatus 200. A program that is installed in the computer 1200 can cause the computer 1200 to function as one or more units of apparatuses of the above embodiments or perform operations associated with the apparatuses of the above embodiments or the one or more units, and/or cause the computer 1200 to perform processes of the above embodiments or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, and a graphics controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, etc. The storage device 1224 may be a hard disk drive, a solid-state drive, etc. The computer 1200 also includes input/output units such as a ROM 1230 and a touch panel, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by computer readable storage media such as the DVD-ROM 1227 or the IC card. The program is read from the computer readable storage media, installed into the storage device 1224, RAM 1214, or ROM 1230, which are also examples of computer readable storage media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable storage media on or near the computer 1200. In addition, a recording medium such as a hard disk or a RAM provided in a server system connected to a dedicated communication network or the Internet can be used as the computer readable storage media, thereby providing the program to the computer 1200 via the network.

Blocks in flowcharts and block diagrams in the above embodiments may represent steps of processes in which operations are performed or units of apparatuses responsible for performing operations. Certain steps and units may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be executed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: network, 52: driver, 54: passenger, 100: vehicle, 110: camera, 111: angle of view, 112: camera, 114: camera, 122: microphone, 124: speaker, 130: display, 142: wireless communication antenna, 144: GPS antenna, 150: steering wheel, 162: driver's seat, 164: front passenger seat, 166: backseat, 200: control apparatus, 202: image acquiring unit, 204: voice acquiring unit, 206: sensor-information acquiring unit, 208: position-information acquiring unit, 210: emotion estimating unit, 212: estimated-emotion sending unit, 220: other-vehicle emotion acquiring unit, 222: determination unit, 224: vehicle-situation acquiring unit, 226: notification control unit, 228: registration unit, 230: notification setting unit, 232: automated-driving control unit, 300: subject vehicle, 302: group of following vehicles, 312: following vehicle, 314: preceding vehicle, 400: information management server, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip

What is claimed is:

1. A control apparatus comprising:
at least one processor;
an other-vehicle emotion acquiring unit configured to acquire an other-vehicle emotion indicating an emotion of an occupant of a second vehicle different from a first vehicle using the at least one processor;
a determination unit configured to determine whether to perform notification to an occupant of the first vehicle based on the other-vehicle emotion using the at least one processor; and
a notification control unit configured to perform control to notify the occupant of the first vehicle of notification information based on the other-vehicle emotion when the determination unit determines to perform the notification using the at least one processor,
wherein the determination unit determines not to perform the notification when the other-vehicle emotion is a positive emotion, and determines to perform the notification when the other-vehicle emotion is a negative emotion.

2. The control apparatus according to claim 1, wherein
the other-vehicle emotion acquiring unit acquires a following-vehicle emotion indicating an emotion of an occupant of a vehicle following the first vehicle, and
the notification control unit performs control to notify the occupant of the first vehicle of notification information including the following-vehicle emotion when the following-vehicle emotion is a negative emotion.

3. A control apparatus comprising:
at least one processor;
an other-vehicle emotion acquiring unit configured to acquire an other-vehicle emotion indicating an emotion of an occupant of a second vehicle different from a first vehicle using the at least one processor, wherein the other-vehicle emotion acquiring unit acquires a following-vehicle emotion indicating an emotion of an occupant of a vehicle following the first vehicle;
a determination unit configured to determine whether to perform notification to an occupant of the first vehicle based on the other-vehicle emotion using the at least one processor;
a notification control unit configured to perform control to notify the occupant of the first vehicle of notification information based on the other-vehicle emotion when the determination unit determines to perform the notification using the at least one processor;
a registration unit configured to register, using the at least one processor, the occupant of the first vehicle as an occupant not to be notified of the notification information including the following-vehicle emotion when an amount of change in emotion of the occupant between before and after notifying the occupant of the notification information is larger than a predetermined threshold, wherein
the notification control unit performs control to notify the occupant of the first vehicle of the notification information including the following-vehicle emotion when the following-vehicle emotion is a negative emotion and the occupant of the first vehicle is not registered as an occupant not to be notified of the notification information.

4. The control apparatus according to claim 1, wherein
the other-vehicle emotion acquiring unit acquires a following-vehicle emotion indicating an emotion of an occupant of a vehicle following the first vehicle, and
the notification control unit performs control to notify the occupant of the first vehicle of notification information prompting the occupant of the first vehicle to perform at least one of making a lane change, resetting a route and taking a rest when the following-vehicle emotion is a negative emotion.

5. A control apparatus comprising:
at least one processor;
an other-vehicle emotion acquiring unit configured to acquire an other-vehicle emotion indicating an emotion of an occupant of a second vehicle different from a first vehicle using the at least one processor;
a determination unit configured to determine whether to perform notification to an occupant of the first vehicle based on the other-vehicle emotion using the at least one processor; and
a notification control unit configured to perform control to notify the occupant of the first vehicle of notification information based on the other-vehicle emotion when the determination unit determines to perform the notification using the at least one processor, wherein
the other-vehicle emotion acquiring unit acquires an other-vehicle emotion indicating an emotion of an occupant of each of a plurality of vehicles successively following the first vehicle,
the determination unit determines to perform the notification when a proportion of negative other-vehicle emotions in a plurality of other-vehicle emotions of the plurality of vehicles is larger than a predetermined proportion, and
the notification control unit performs control to notify the occupant of the first vehicle of notification information indicating that a plurality of other-vehicle emotions are negative.

6. A control apparatus comprising:
at least one processor;
an other-vehicle emotion acquiring unit configured to acquire an other-vehicle emotion indicating an emotion of an occupant of a second vehicle different from a first vehicle using the at least one processor;
a determination unit configured to determine whether to perform notification to an occupant of the first vehicle based on the other-vehicle emotion using the at least one processor; and
a notification control unit configured to perform control to notify the occupant of the first vehicle of notification information based on the other-vehicle emotion when the determination unit determines to perform the notification using the at least one processor, wherein
the other-vehicle emotion acquiring unit acquires a following-vehicle emotion indicating an emotion of an occupant of a vehicle following the first vehicle and a preceding-vehicle emotion indicating an emotion of an occupant of a vehicle preceding the first vehicle, and
the determination unit determines to perform the notification when a difference between the following-vehicle emotion and the preceding-vehicle emotion meets a predetermined condition.

7. The control apparatus according to claim 6, wherein the notification control unit performs control to notify the occupant of the first vehicle of notification information based on the following-vehicle emotion when the difference between the following-vehicle emotion and the preceding-vehicle emotion meets the predetermined condition, the following-vehicle emotion is a negative emotion, and the preceding-vehicle emotion is a positive emotion.

8. The control apparatus according to claim 6, wherein the notification control unit performs control to notify the occupant of the first vehicle of notification information based on the preceding-vehicle emotion when the difference between the following-vehicle emotion and the preceding-vehicle emotion meets the predetermined condition, the following-vehicle emotion is a positive emotion, and the preceding-vehicle emotion is a negative emotion.

9. The control apparatus according to claim 1, wherein
the other-vehicle emotion acquiring unit acquires a preceding-vehicle emotion indicating an emotion of an occupant of a vehicle preceding the first vehicle, and
the notification control unit performs control to notify the occupant of the first vehicle of notification information recommending not to overtake the preceding vehicle when the preceding-vehicle emotion is a negative emotion.

10. The control apparatus according to claim 1, wherein
the first vehicle is an automated driving vehicle,
the other-vehicle emotion acquiring unit acquires a preceding-vehicle emotion indicating an emotion of an occupant of a vehicle preceding the first vehicle, and
the control apparatus comprises an automated-driving control unit configured to control automated driving of the first vehicle such that the first vehicle does not overtake the preceding vehicle when the preceding-vehicle emotion is a negative emotion.

11. A non-transitory computer-readable storage medium having stored thereon a program that causes a computer having at least one processor to function as:
an other-vehicle emotion acquiring unit configured to acquire an other-vehicle emotion indicating an emotion of an occupant of a second vehicle different from a first vehicle using the at least one processor;
a determination unit configured to determine whether to perform notification to an occupant of the first vehicle based on the other-vehicle emotion using the at least one processor; and
a notification control unit configured to perform control to notify the occupant of the first vehicle of notification information based on the other-vehicle emotion when the determination unit determines to perform the notification using the at least one processor,
wherein the determination unit determines not to perform the notification when the other-vehicle emotion is a positive emotion, and determines to perform the notification when the other-vehicle emotion is a negative emotion.

12. A control apparatus comprising:
at least one processor;
an other-vehicle emotion acquiring unit configured to acquire a preceding-vehicle emotion indicating an emotion of an occupant of a vehicle preceding an automated driving vehicle using the at least one processor; and
an automated-driving control unit configured to control automated driving of the automated driving vehicle such that the automated driving vehicle does not overtake the preceding vehicle when the preceding-vehicle emotion is a negative emotion using the at least one processor, wherein the automated-driving control unit determines not acquire the preceding-vehicle emotion if the preceding-vehicle emotion is a positive emotion, and determines to acquire the preceding-vehicle emotion if the preceding vehicle emotion is a negative emotion.

13. The control apparatus according to claim 12, wherein the other-vehicle emotion acquiring unit acquires a following-vehicle emotion indicating an emotion of an occupant of a vehicle following the automated driving vehicle, and the automated-driving control unit controls automated driving of the automated driving vehicle such that the automated driving vehicle makes a lane change when the following-vehicle emotion is a negative emotion.

* * * * *